A. ALBERTSON.
Air-Cooling Apparatus.
No. 198,830. Patented Jan. 1, 1878.
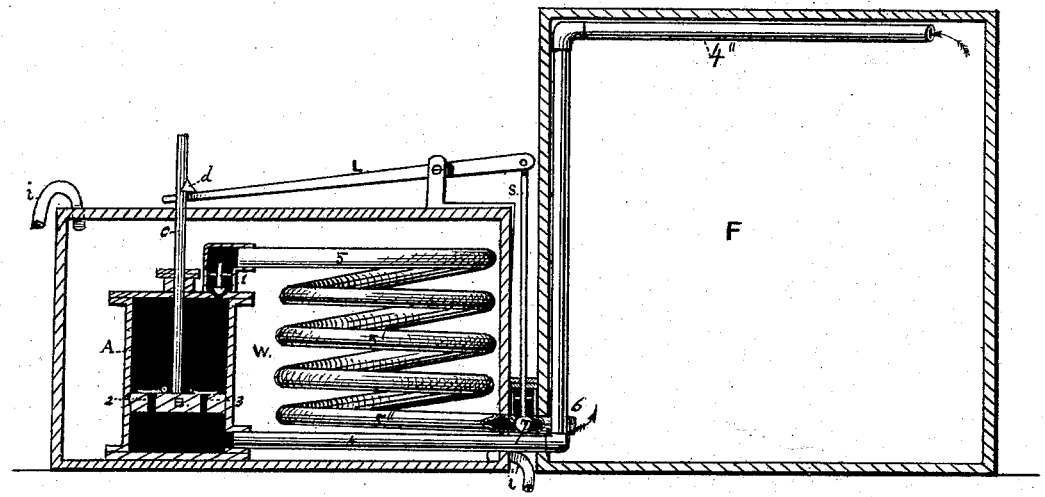
WITNESSES
INVENTOR
ATTORNEY

UNITED STATES PATENT OFFICE.

ALBERT ALBERTSON, OF JERSEY CITY, NEW JERSEY, ASSIGNOR TO SIMON BENTON HUNT, OF NEW YORK, N. Y.

IMPROVEMENT IN AIR-COOLING APPARATUS.

Specification forming part of Letters Patent No. 198,830, dated January 1, 1878; application filed July 26, 1877.

*To all whom it may concern:*

Be it known that I, ALBERT ALBERTSON, of Jersey City, in the county of Hudson and State of New Jersey, have invented certain new and useful Improvements in Apparatus for Reducing the Temperature in Refrigerating-Chambers; and I do hereby declare that the following is a full, clear, and exact description thereof, which will enable others skilled in the art to which it appertains to make and use the same, reference being had to the accompanying drawings, and to the letters of reference marked thereon, which form a part of this specification.

This invention relates to that class of apparatus employed for refrigerating or cooling purposes, for the preservation of perishable substances, or for other purposes; and it consists in the arrangement and use of the several parts shown in the accompanying drawing, to wit:

A is an air-pump, provided with valves 1 2 3, rod $c$, and plunger B, projecting catch $d$, which operates the lever L to open the escape-valve 7, to admit and regulate the flow of compressed air into the chamber F for any desired purpose. W is a water or cold-air chamber or tank, containing a spiral coil of pipe, similar to the worm of a still, and the air-pump A. This spiral air-tube communicates with the pump A through the egress-valve 1, which admits the compressed air into the upper coil 5 of the cooling-worm 5 5' 5'' in the cold-air or water chamber W. The compressed air passes through the coil, and discharges itself through the drop-valve at 7, connected to and operating with the rod $s$, which is worked by the lever L. The compressed air escapes through section 6 of pipe 5'' into the refrigerating-chamber F, where it expands and fills the whole compartment with cold air. It is then drawn back through the ingress-pipe 4'' and 4 by the force-pump A while in a cold state; and, by being passed the second or more times through the pump A and coil 5, it becomes further reduced in temperature, to effect my cooling process; or, the said compressed air may be conveyed into the cooling-tank W directly from the refrigerating-chamber F, and then employed to cool the coil 5 and pump A, in lieu of the water.

In this instance the air-pump A draws its supply of fresh air from the outside atmosphere preparatory to forcing it through the coils 5 5' 5'', to accomplish its double use of cooling the chamber F and afterward the coil 5 and pump A. When water is used the tank W is fed through the inlet $i$, and the same is drawn off through pipe $i'$. Similar pipes are used for admitting and discharging air, when required. Therefore the novelty of my above-described invention consists in the mode of manipulating and expanding compressed air in an open room or chamber, F, through a coil, 5, provided with regulating-valves or cut-offs 1 and 7, all arranged in a cooling-tank, W, outside of the refrigerating-chamber F, and operated by an air-pump, A, also inside of said cooling-tank, filled with either cold water or cold air, supplied substantially as above described.

I am aware that machines have been invented for reducing the air in chambers for refrigerating purposes by the use of air-pumps when operated to produce such a result. I do not, therefore, claim anything, broadly, for this principle.

What I do claim as new, and desire to secure by Letters Patent, is—

The refrigerating apparatus composed of the air-pump A, with its valves 1 2 3, in combination with the coil of pipe 5 5' 5'', and drop-valve 7, said valve being operated by the piston-rod $a$, through the lever L, to admit compressed air to the chamber F at intervals, as and for the purpose set forth.

In testimony that I claim the foregoing as my own I affix my signature in presence of two witnesses.

ALBERT ALBERTSON.

Witnesses:
JAMES P. McLEAN,
J. RITCHIE McLEAN.